United States Patent Office 3,171,127
Patented Feb. 23, 1965

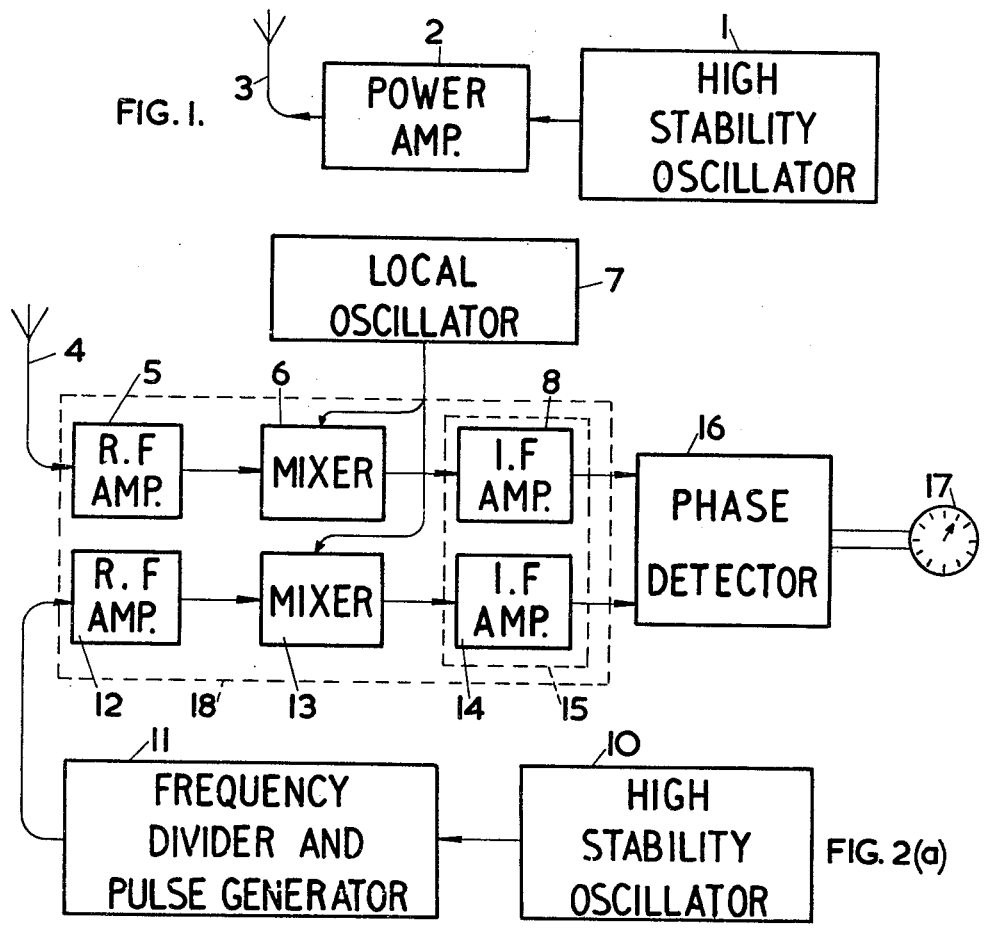
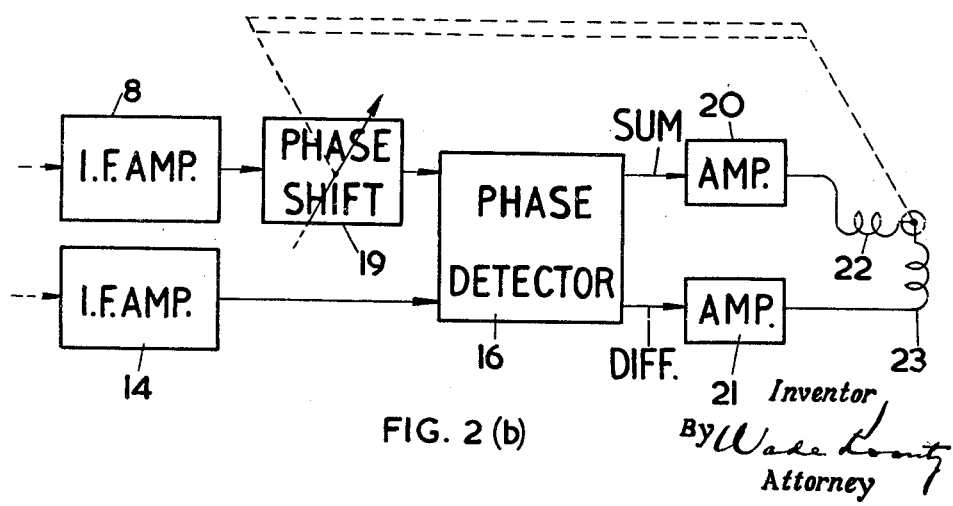

3,171,127
RADIO NAVIGATION APPARATUS
John Dimitri Asteraki, 20 Loring Road, Sharnbrook, Bedfordshire, England; Charles Reginald Nowell Barnard, "Meirion," Boundary Road, Farnborough, Hampshire, England; and Aden Noel Beresford, 39 Tivoli Road, Cheltenham, Gloucestershire, England
Filed Oct. 2, 1962, Ser. No. 227,754
2 Claims. (Cl. 343—112)

This invention relates to radio navigation aids and especially to those affording information as to distance traveled by a mobile craft.

It is known already that the phase relationship between a signal received from a constant frequency transmitter and a constant reference frequency signal generated locally with respect to the receiver will change as the distance between transmitter and receiver changes. Indeed, it has been envisaged that such change in phase relationship between received and local reference signals could be utilised to measure the distance traveled by a mobile craft relative to a transmitter. It will be seen that for each distance change equal to one wavelength at the frequency employed there will be a phase relationship change of 360 degrees and for a distance change less than one wavelength there will be a phase relationship change correspondingly less than 360 degrees.

According to the invention radio navigation apparatus for use in a mobile craft to obtain a measure of distance traveled thereby with respect to, i.e. towards or away from, at least one transmitter of high frequency stability comprises essentially high stability reference oscillator means affording at least one reference signal; a receiver for signals from at least one transmitter of high frequency stability and having in addition to at least one channel for a received signal from a transmitter, at least one channel for a reference signal from the reference oscillator means, said received and reference signal channels being closely similar whereby any phase disturbances of the signals therein are also closely similar; and phase detector means fed respectively from received and reference signal channels of the receiver and affording an output dependent upon the phase difference between the received and reference signals from said channels.

Preferably, the receiver is of superheterodyne type having one mixer stage per channel and a single local oscillator common to one received signal channel and one local reference signal channel at least.

The receiver may have at least one temperature controlled enclosure common to parts at least of received and reference signal channels thereof.

The phase detector means may include means affording two signals corresponding respectively to the sum and difference of the phases of the signals fed thereto from received and reference signal channels of the receiver; variable phase shift means in the feed thereto from one of said channels; and, means responsive to inequality of said sum and difference signals connected to control said variable phase shift means in the sense to reduce said inequality whereby the arrangement is null-seeking and the setting of the phase shift means corresponds to the phase difference of received and reference signals.

In such a null-seeking arrangement the setting of the phase shift means may be variable mechanically and the means responsive to the sum and difference signals may be motor means connected mechanically to vary the setting of the phase shift means, the arrangement including, if desired, an indicator connected mechanically to be operated by said motor means and which may be calibrated in terms of distance traveled by a craft in which the apparatus is installed.

The reference oscillator means may include harmonic generator means whereby it affords a number of stable reference signals at harmonically related frequencies from which one may be selected by appropriate tuning of a receiver reference signal channel. In a preferred arrangement the reference oscillator means includes a relatively high frequency stable oscillator and a frequency divider which is arranged to provide a succession of sharp narrow pulses at a pre-determined recurrence frequency.

Preferably, e.g. where great distances from a transmitter operating at a very low frequency are involved, the apparatus includes compensating means for reducing diurnal and/or other distance error due to known or estimated signal path disturbances, for example by an additional adjustment of phase shift means at the output of a receiver channel.

Embodiments of the invention will now be described with reference to the accompanying drawings in which:

FIGURE 1 is a block schematic circuit diagram of a transmitter.

FIGURE 2(a) is a block schematic circuit diagram of apparatus for use in a mobile craft and FIGURE 2(b) is a block schematic circuit diagram of a modification of part of the circuit shown in FIGURE 2(a).

FIGURE 1 shows a highly stable oscillator 1 having a frequency stable to at least one part in $10^9$ per week. This oscillator may be a Caesium nuclear spin oscillator of known form. The output from the oscillator 1 is applied to a power amplifier 2 and the output of the power amplifier 2 is applied to a transmitting aerial 3.

FIGURE 2(a) shows a receiving aerial 4 the output of which is applied to a radio-frequency amplifier 5. This amplifier is a narrow band, high Q, amplifier for reasons to be explained hereinafter. The output of the RF amplifier 5 is applied to a mixer 6 where the radio-frequency signal is mixed with a signal from a local oscillator 7. The difference frequency signal from the mixer 6 is amplified in an intermediate frequency amplifier 8 which has a very high Q. The RF amplifier 5, mixer 6 and IF amplifier 8 constitute a received signal channel of the receiver.

FIGURE 2(a) also shows a crystal oscillator 10 which has a frequency stability of one part in $10^9$ per week. Such an oscillator may be obtained by the use of quartz overtone crystal in a Colpits oscillator generating oscillations having a very low amplitude. The whole oscillator is housed in a temperature-controlled oven (not shown) and provides a frequency of 5 mc./s. The output of the oscillator 10 is applied to a frequency divider and pulse emitter circuit 11. This circuit consists of a series of standard frequency divider stages the last of which is arranged to provide a succession of sharp narrow pulses at a pulse recurrence frequency of 100 pulses per second. It follows that these narrow pulses are spaced 10 milli-seconds apart in time. The pulse output from frequency divider and pulse emitter circuit 11 is applied to a radio-frequency amplifier 12. The output of the RF amplifier 12 is applied to a mixer 13 in which it is mixed with the output of the local oscillator 7. The output of the mixer 13 is applied to an intermediate amplifier 14. The RF amplifier 12, mixer 13 and IF amplifier 14 constitute a reference signal channel and are closely similar to those 5, 6 and 8 respectively, of the received signal channel. It will be seen that the local oscillator 7 is common to both the signal channels. Each of the intermediate frequency amplifiers 8 and 14 has a Q of the order of 500 and is designed to pass a frequency of 525 c./s. These amplifiers are shown diagrammatically in the drawing to be enclosed in a temperature-controlled oven 15. Alternatively, only those temperature-sensitive components which have an effect on the phases of the received and reference signals passing through the two amplifiers may be placed in a common temperature-controlled oven.

The amplifiers 5, 8, 12 and 14 and the mixers 6 and 13 are housed in a common enclosure indicated by the dotted line 18, so that the ambient temperature conditions are the same for both signal channels, and they may all share a common chassis in this enclosure 18.

The outputs of the IF amplifiers 8 and 14 i.e. of the two signal channels, are fed to the two inputs of phase detector means 16 and the phase difference between the received and reference signals applied to the phase detector means 16 is indicated on a meter 17.

The operation of the circuit of FIGURE 2(a) is as follows: For the purposes of explanation, the incoming signal to the aerial 4 will be assumed to have a frequency of 16 kc./s. This received signal is amplified in the narrow-band RF amplifier 5 and mixed with a frequency of 16.525 kc./s. from the local oscillator 7 in the mixer 6 to produce an output having a frequency of 525 c./s. which is amplified in the narrow-band IF amplifier 8.

The pulse at a pulse recurrence frequency of 100 pulses per second from the frequency divider and pulse emitter 11 contain many harmonics of the frequency 100 c./s. and these pulses are applied to the RF narrow-band amplifier 12 which is tuned to a frequency of 16 kc./s.; that is to say, the 160th harmonic of the pulse recurrence frequency. Each pulse applied to the RF amplifier 12 produces a damped oscillation at the output of the latter at a frequency of 16 kc./s. The mixer 13 converts the frequency of this damped oscillation to 525 c./s. and this damped oscillation is applied to the IF amplifier 14. Because of the high Q of the amplifier, the oscillations are maintained during each interpulse period so that at the output of the IF amplifier 14, a continuous signal appears at the frequency of 525 c./s. Because the two receiver channels are closely similar and employ a common local oscillator 7, the phase changes through the two channels are also closely similar. It follows that the reading of the meter 17 is a true indication of the phase difference between the signal received by the aerial 4 and the crystal oscillator 10.

FIGURE 2(b) shows a modification of the right-hand portion of FIGURE 2(a) in which the output of the received signal channel IF amplifier 8 is fed to a variable phase shifter 19 whose output is in turn fed to the corresponding input of the phase detector 16 which in this case is of a type furnishing sum and difference outputs which are fed, respectively, to two amplifiers 20 and 21 whose outputs are fed to windings 22 and 23, respectively, of an electromagnetic motor device of known type connected mechanically to adjust or vary the setting of the phase shifter 19, according as either the sum or the difference output from the phase detector 16 is tending to increase in relation to the other, in the sense required to maintain equality of said outputs, so that the setting or adjustment at any time of the phase shifter 19, for instance the angular position about its axis of a shaft mechanically coupling said motor device to the phase shifter 19, corresponds to the phase difference between the received and reference signals at that time, whereby said phase difference may be presented by a pointer and scale calibrated for example in terms of miles travelled.

Apparatus according to the invention will, in general, include resolver or computer means for determining from information as to change of distance with respect to two transmitters information as to change in actual position of the craft in which it is installed. For example, there may be one set of apparatus such as that just described with reference to the accompanying drawings, for each of the two transmitters employed, although a single highly stable oscillator means affording many harmonically related highly stable reference signals may be common to both sets—as may also a single local oscillator in some cases.

It is important that the received signals in apparatus according to the invention may be those from existing commercial or other communications transmitters, of which there already exist a number operating in the VLF band with high frequency stability of the order of 1 part in $10^9$ or better. Such irregularities or discontinuities as may normally exist in the regular transmissions from such transmitters, as will not be accommodated by the sharply resonant high Q signal channel amplifiers may, within wide limits, be largely accommodated by the use of computer means having a memory or store which will supply, so to speak, an artificial phase difference signal whenever a real one is not available from a receiver and its associated phase detector means.

In general, there will be one received signal channel and one reference signal and associated phase detector means per transmitter used to obtain position information.

The received signal channels of apparatus according to the invention will, in general, have automatic gain control means to minimise the effect of varying signal strength, particularly when the craft carrying the apparatus is far from a transmitter.

Also, for working at long distances from a transmitter the apparatus will, in general, include means for reducing diurnal or other error due to known or estimated signal path disturbances, for example by adjustment or setting of phase shift means at the output of a received or reference signal channel.

With operation in the VLF band it is expected that complete world coverage as regards positional information with error limits of about plus or minus ten miles is obtainable by the use of about six highly stable transmitters—some or all of which may be existing communication's transmitters—appropriately distributed over the surface of the earth, or a correspondingly smaller number of transmitters to cover only those regions where position information is most likely to be of substantial use.

We claim:
1. Radio navigation apparatus for obtaining a measure of the distance traveled by a mobile craft with respect to a transmiter of high frequency stability comprising: a high stability reference oscillator means for generating a reference signal; a superheterodyne type receiver having a first channel for receiving a first signal from said transmitter and a second channel for receiving a second signal from said reference oscillator, said first and second channels being closely similar whereby any phase disturbances of the signals therein are also closely similar; a mixer stage in each of said channels; a local oscillator common to each said mixer stage; phase detector means fed respectively from said first and second channels of the receiver and affording an output dependent upon the phase difference between said first and second signals; and a temperature controlled oven enclosing at least those temperature-sensitive components of said first and second channels which have an effect on the phases of the signals passing through said channels.

2. Radio navigation apparatus as claimed in claim 1 wherein said phase detector means includes means affording two signals corresponding respectively to the sum and difference of the phases of the signals fed thereto from the first and second channels of the receiver; mechanically variable phase shift means in the feed to said phase detector from one of said channels; and motor means responsive to inequality of said sum and difference signals connected to control said variable phase shift means in the sense to reduce said inequality whereby the arrangement is null-seeking and the setting of the phase shift means corresponds to the phase difference of the signals in said first and second channels.

References Cited by the Examiner
UNITED STATES PATENTS

| | | | |
|---|---|---|---|
| 2,838,753 | 6/58 | O'Brien et al. | 343—112.3 X |
| 2,924,820 | 2/60 | Dishal et al. | 343—112.3 X |
| 3,078,415 | 2/63 | Frelich | 343—113 X |

CHESTER L. JUSTUS, *Primary Examiner.*